(12) United States Patent
Cheng

(10) Patent No.: US 7,111,079 B2
(45) Date of Patent: Sep. 19, 2006

(54) ARCHITECTURE OF A BRIDGE BETWEEN A NON-IP NETWORK AND THE WEB

(75) Inventor: Doreen Yining Cheng, Los Altos, CA (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 806 days.

(21) Appl. No.: 09/736,069

(22) Filed: Dec. 13, 2000

(65) Prior Publication Data

US 2001/0032273 A1   Oct. 18, 2001

Related U.S. Application Data

(60) Provisional application No. 60/184,310, filed on Feb. 23, 2000.

(51) Int. Cl.
  *G06F 15/16* (2006.01)
  *H04N 7/173* (2006.01)
(52) U.S. Cl. .................................. 709/249; 725/109
(58) Field of Classification Search ................ 709/230, 709/249; 725/46, 109, 110, 90, 132, 133, 725/152, 148, 149, 150, 37, 153, 230, 249
See application file for complete search history.

(56) References Cited

U.S. PATENT DOCUMENTS 5,959,536 A   9/1999  Chambers et al.
6,523,696 B1 *  2/2003  Saito et al. ................. 709/223

2001/0047431 A1* 11/2001  Eytchison ................... 709/249

FOREIGN PATENT DOCUMENTS

| EP | 0814393 A1 | 5/1997 |
|---|---|---|
| EP | 0929170 A2 | 1/1999 |
| EP | 0932275 A2 | 1/1999 |
| EP | 1 063 829 A | 12/2000 |
| WO | WO 99/35753 | 7/1999 |
| WO | WO 00 76130 A | 12/2000 |

OTHER PUBLICATIONS

U.S. Appl. No. 09/160,490, filed, Sep. 25, 1998, Turner et al.
U.S. Appl. No. 09/165,682, filed, Oct. 2, 1998, Shteyn.
"The HAVi Specification: Specification of the Home Audio/Video Interoperability (HAVi) Architecture", by Sony, Philips, Hitachi, Sharp, Matsushita, Thomson, Toshiba, and Grundig, Version 1.0, Jan. 18, 2000, Section 6.11 "Web Proxy FCM", pp. 362-370.

* cited by examiner

*Primary Examiner*—Zarni Maung
*Assistant Examiner*—Ashok Patel

(57) ABSTRACT

Thin glue layers bridge a Non-IP network and the Internet Web. Existing services in both networks are used directly wherever feasible, thereby achieving simplicity and efficiency. A Non-IP-specific application can use a Non-IP API to access Internet services, and an IP-based Internet browser can use commands encoded in HTTP, XML, Java, or proprietary formats to access Non-IP services and to control Non-IP devices. In this manner, changes are not required to the Internet browser. The glue layers translate between the IP protocol and Non-IP API, but also allow commands and responses to tunnel between end applications in the Internet and the Non-IP network without interpretation.

8 Claims, 2 Drawing Sheets

ARCHITECTURE OF A BRIDGE BETWEEN A NON-IP NETWORK AND THE WEB

This application claims the benefit of provisional U.S. patent application Ser. No. 60/184,310, filed 23 Feb. 2000.

BACKGROUND OF THE INVENTION

1. Field of the Invention

This invention relates to the field of consumer electronics, and in particular to a bridge that facilitates the coupling of a non-IP-compliant network, such as HAVi, and the Internet Web.

2. Description of Related Art

A Home Audio/Video Interoperability (HAVi) network is an example of a network that allows all manner of digital consumer electronics and home appliances that comply with the HAVi specification to communicate with each other. HAVi is a digital audio/video networking initiative that provides a home networking software specification for seamless interoperability among home entertainment products. As its name implies, the HAVi specification is specifically designed for the interoperability of audio/video (AV) devices. It includes, for example, specific Functional Component Modules (FCMs) for controlling tuners, VCRs, cameras, AV discs, and so on. The HAVi specification defines middleware that manages multi-directional AV streams, event schedules, and registries, while providing Application Program Interfaces (APIs) for creating new generations of software applications. Other home and office automation network technologies include Universal Plug and Play (UPnP), the Universal Serial Bus (USB), HomeRF Lite, and the Bluetooth standard, each involving substantial contributions from Philips Electronics, the OSGI/Jini technology of Sun Microsystems, Inc., and others.

Preferably, functions on a device within a network system may be controlled from another device within the system. U.S. Pat. No. 5,959,536, "TASK-DRIVEN DISTRIBUTED MULTIMEDIA COMPUTER SYSTEM", issued 28 Sep. 1999 for Paul Chambers and Saurabh Srivastava, assigned to Philips Electronics North America, and incorporated by reference herein, discloses a control system wherein controllers act upon respective software representations of each consumer device on a network. By encapsulating the variable complexity of tasks within a software representation, the control can be made as simple or as sophisticated as needed to bring the capabilities up to a common level, and applications can uniformly manipulate devices that embody very different levels of sophistication and complexity.

Each of the various networks generally offers particular advantages for the types of devices that they are intended to support, and therefore it is likely that more than one network may be present in a home or office environment. Most network architectures allow for some interaction between networks, the interaction is generally limited to providing access to an alternative network. The HAVi specification, for example, allows for a Web proxy FCM[1] that offers sharable access to the Internet, as illustrated by the system 100 of FIG. 1. As defined in the HAVi specification, a client 110 locates a Web proxy FCM 140 on the HAVi network 130, and communicates with the FCM 140 via the message passing scheme 120 of the HAVi protocol. The Web proxy FCM 140 provides the following Web services: Open, Close, Send, Receive, and Get Capability. The client 110 calls the Open service to open a connection to the Internet 170 via the TCP/IP 150 and Internet access 160 modules. This service includes, for example, allocating buffers for sending and receiving information, dialing a modem connection, accessing a service provider, and so on. Thereafter, the client 110 calls the Send service to send messages to specified Web servers 180 on the Internet 170, and the FCM 140 uses the Receive service to send messages from the Internet 170 to the client 110. The Close service closes the Internet access for a particular client 110. The Get Capability service permits the Web client 110 to discover the protocols (HTTP, FTP, SMTP, etc.) supported by the Web proxy FCM 140.

[1]. "The HAVi Specification: Specification of the Home Audio/Video Interoperability (HAVi) Architecture", by Sony, Philips, Hitachi, Sharp, Matsushita, Thomson, Toshiba, and Grundig, Version 1.0, 18 Jan. 2000, Section 6.11 "Web Proxy FCM", pages 362–370.

Other networking protocols generally include foreign-network access capability, with more or less the same level of interoperability between networks as provided by the HAVi Web proxy FCM. The notable exceptions are UPnP and OSGI, which employ an IP (Internet Protocol) network protocol, and provides a significant level of integration among UPnP devices and Web services and capabilities. For ease of reference, the term IP network is used herein to define a network and associated software/middleware that is compliant with the Internet Protocol (IP), and the term Non-IP network is used herein to define a network and associated software/middleware that is not necessarily compliant with the IP. In like manner, IP devices or objects are herein devices or objects that are compliant with IP, and Non-IP devices or objects are devices or objects that are not necessarily compliant with IP.

Although the HAVi, and other Non-IP network specifications, allows a client, such as a set-top-box, to access to the Internet, they do not, per se, provide a 'bridge' between the networks that enables mutual access of services between a Non-IP network and the Internet Web. Conventionally, a mutual access of services between the Non-IP network and an IP network generally requires a modification of objects on one or both of the networks to achieve this integration. A suggested approach, for example, to allow a web-browser to control devices on a HAVi network is the use of a "Local" addressing type in lieu of a Universal Resource Locator (URL) addressing type at the Web proxy FCM. When this local address is used, a web-browser fetches and displays a HTML-based user interface (UI) that controls the HAVi device. This solution, however, requires that the web-browser be modified to support this HAVi-specific "local" keyword. This solution also limits the use of this control to "local" web-browsers, thereby precluding remote control via an Internet link.

BRIEF SUMMARY OF THE INVENTION

It is an object of this invention to enable symmetric and efficient access of services between a Non-IP network and the Internet Web. It is a further object of this invention to enable this symmetric access of services without modifications to existing access means, such as existing web-browsers.

These objects, and others, are achieved by providing thin glue layers to bridge a Non-IP network and the Internet Web. Existing services in both networks are used directly wherever feasible, thereby achieving simplicity and efficiency. Using HAVi as a prototypical Non-IP network, for example, a HAVi-specific application can use a HAVi API to access Internet services, and an IP-based Internet browser can use commands encoded in HTTP, XML, Java, or proprietary formats to access HAVi services and to control HAVi devices. The glue layers translate between the IP protocol and HAVi API, but also allow commands and responses to tunnel between end applications in the Internet and the HAVi network without interpretation.

The thin glue layers are designed to make the relationship between objects in different networks simple and to allow efficient reuse of facilities that are already in, or expected to be in, the networks. Specifically, continuing to use the HAVi paradigm:

To an Internet web server, a HAVi object (for example, a HAVi software element) appears to be an Internet browser;

To a HAVi object, the entire Internet web appears to be a HAVi FCM;

To an Internet browser, a HAVi network appears to be an Internet web server; and To a HAVi network, an Internet browser appears to be a HAVi application.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

For ease of understanding and illustration, the invention is presented using a HAVi network as a paradigm for a non-IP-compliant network, although the principles of the invention are not limited to a HAVi network, and one of ordinary skill in the art will recognize the parallels between the HAVi specification and capabilities and the specification and capabilities of other non-IP-compliant (Non-IP) networks.

Figure 1:
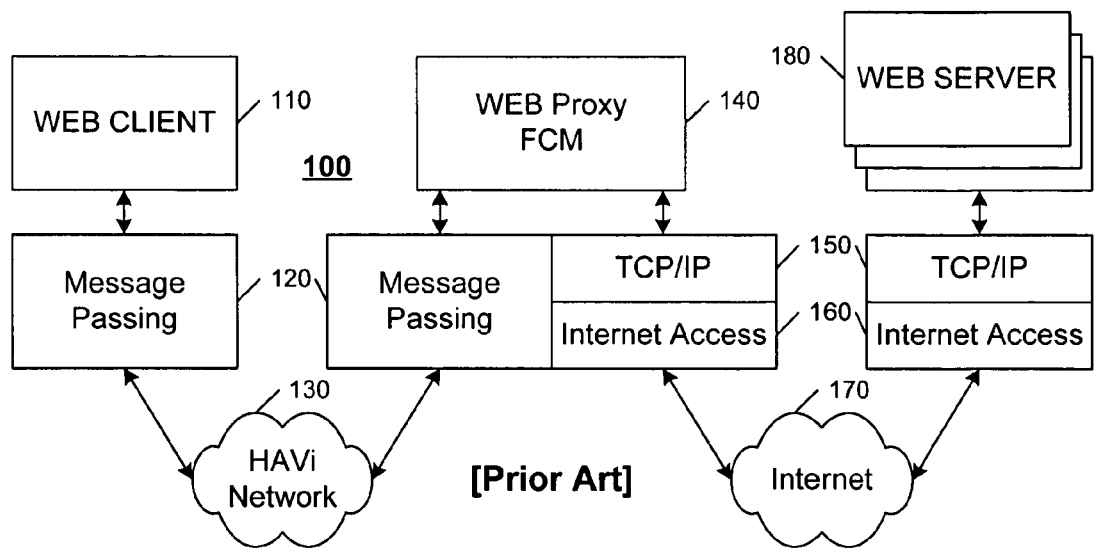
FIG. 1 illustrates an example block diagram of a prior art HAVi-Web interface scheme.
Figure 2:
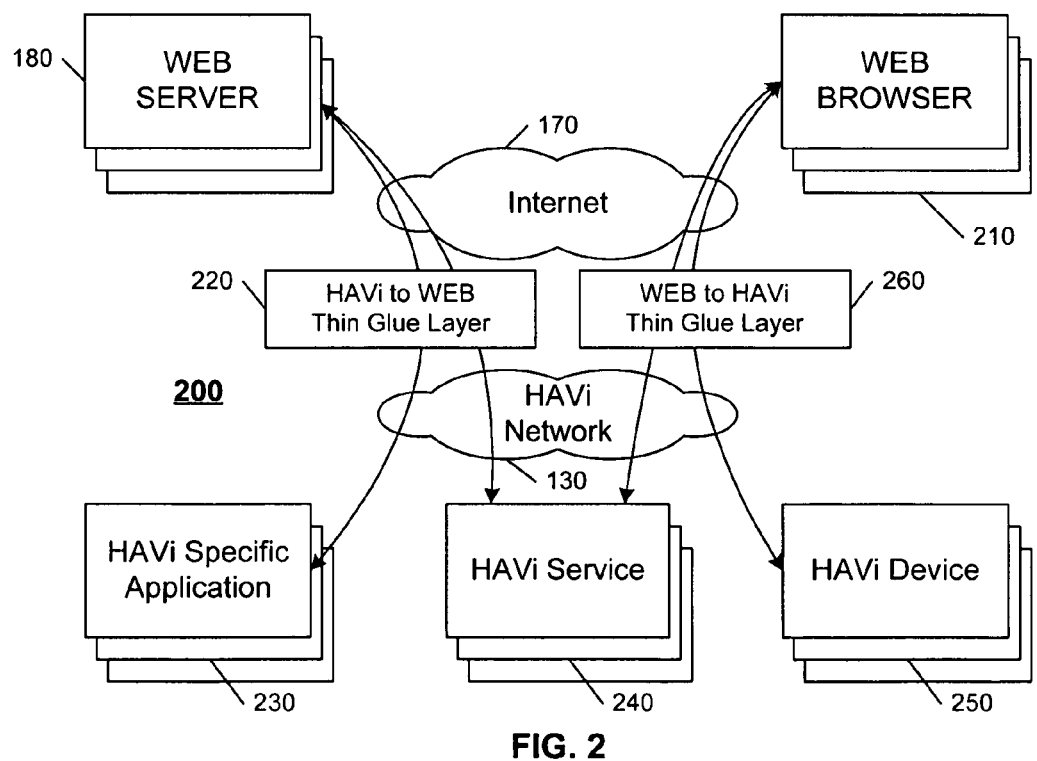
FIG. 2 illustrates an example block diagram of a HAVi-Web bridge in accordance with this invention.

In accordance with this invention, and as illustrated in FIG. 2, a bridge is formed between the Internet 170 and a HAVi network 130 via two thin glue layers 220, 260. These glue layers 220, 260 enable symmetric and efficient access of services between the HAVi network 130 and the Internet 170. For example, it enables a HAVi-specific browser 230 to access Internet services 180, and allows existing Web browsers 210, such as Netscape or Internet Explorer, to access services 240 provided by the HAVi network 130, and to control devices 250 on the HAVi network 130.

The thin layers 220, 260 facilitate the use of existing services in the HAVi network 130 and the Internet 170 as directly as possible, by allowing communications to tunnel between objects 180, 210 on the Internet 170 and objects 140, 150, 160 on the HAVi network 130, without interpretation or translation by the thin layers 220, 260. In a preferred embodiment, the interpretation of messages are the responsibility of the communicating objects, such as the HAVi-specific application 230 and the Web server 180, or a Web browser 210 and a HAVi device control module (DCM) associated with a HAVi device 250 or a HAVi functional control module associated with a HAVi service 240. Allowing messages to tunnel through the glue layers 220, 260, without translation or interpretation, provides maximum flexibility for encoding the messages between the communicating objects, including HTTP, XML, proprietary formats, combinations of formats, and so on.

Copending U.S. patent application, "CUSTOMIZED UPGRADING OF INTERNET-ENABLED DEVICES BASED ON USER-PROFILE", Ser. No. 09/160,490, filed 25 Sep. 1998 for Adrian Turner et al, and incorporated by reference herein, enhances the Internet services in view of the proliferation of Internet-enabled devices by providing a method of enabling customizing a technical functionality of network-enabled equipment of an end-user, based on a profile that is associated with the user. By providing the aforementioned tunneling of communications between the Internet 170 and a HAVi network 130, the principles of this copending application can be extended to each of the HAVi devices 160 on the HAVi network 130 easily, regardless of the protocols or languages used to effect the customization.

Figure 3:
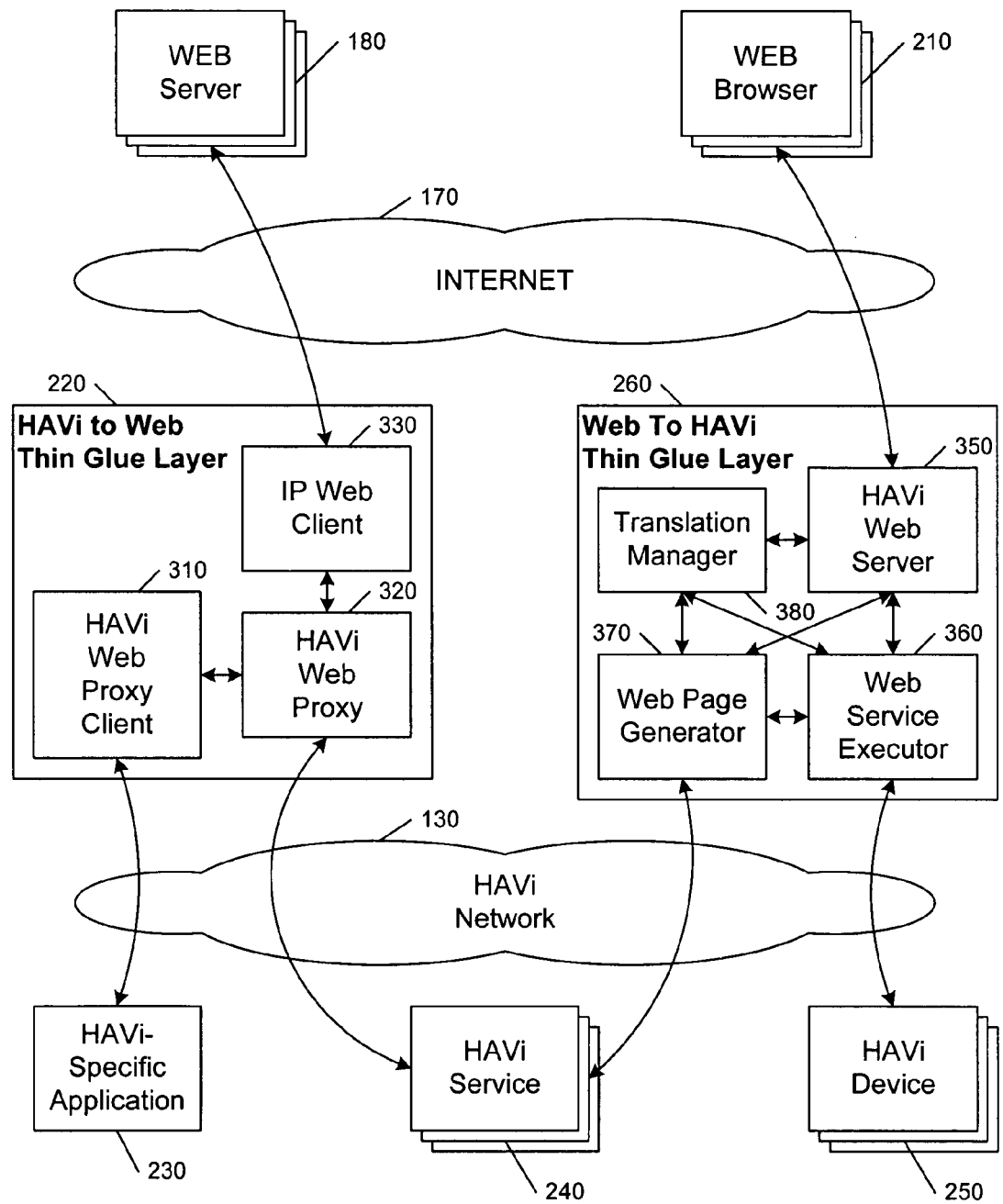
FIG. 3 illustrates an example block diagram of a HAVi-to-Web and a Web-to-HAVI interface of a HAVi-Web bridge in accordance with this invention.

FIG. 3 illustrates an example block diagram of the HAVi-to-Web 220, and Web-to-HAVi 260 thin glue layers.

HAVi-to-WEB THIN GLUE LAYER

The HAVi-to-Web glue layer 220 makes the Internet web 170 behave like a HAVi FCM to a HAVi system 130, and makes the HAVi-specific applications 230 behave like an IP Web browser to the Web server 180. The HAVi-to-Web glue layer 220 includes a HAVi-Web proxy client 310, a HAVi-Web proxy 320, and an IP (Internet Protocol) Web client 330.

The HAVi-Web proxy client 310 supports the Application Program Interface (API) defined for a HAVi-Web FCM client component of a Web proxy FCM, as discussed above with regard to the Web proxy FCM 140. If there is no Web proxy FCM 140 on the local system, the HAVi-Web proxy client 310 translates the API invocations to HAVi messages and HAVi messaging system services. Otherwise the HAVi-Web proxy client 310 accesses the local HAVi web proxy 320 directly for higher efficiency. Typically, an instance of the HAVi web proxy client 310 works with a single HAVi-specific application 230. Therefore, to a HAVi Web proxy 320, the HAVi-Web proxy client 310 solely represents the HAVi-specific application 230. Multiple HAVi web proxy clients 310 can interact simultaneously with a HAVi web proxy 320.

In a preferred embodiment, the HAVi web proxy client 310 manages interactions between the application 230 and Internet web servers 180 through sessions, each session being identified by a Universal Resource Locator (URL). The HAVi-Web proxy client 310 supports multiple transactions in a session. A transaction, which may be synchronous or asynchronous, starts when a request is issued from the application 230 to an Internet web server 180, and ends when the application 230 receives the complete response, which may include multiple Internet messages, from the Internet web server 180.

The HAVi-Web proxy 320 supports the API defined for a HAVi-Web FCM server component of the Web proxy FCM 140, and makes the IP Web client 330 appear to the HAVi network 130 as a HAVi Software Element. The HAVi-Web proxy 320 interacts with a remote HAVi-Web proxy client 310 through HAVi messages and the HAVi messaging system. In a preferred embodiment, the HAVi-web proxy 320 interacts with a local HAVi web proxy client 310 via direct invocation, for improved efficiency. In case of remote clients 310, the HAVi web proxy 320 translates the messages into method invocations to the IP Web client 330 to effect Internet operations.

The IP Web client 330 is configured to appear as a client to an IP-based web server 180. The IP Web client 330 translates HAVi FCM server API invocations into TCP/IP operations. In accordance with this invention, the IP Web client 330 allows messages that are not API invocations to tunnel between the HAVi-specific application 230 and the Internet Web server 180. The tunneling messages can be in HTTP, XML, Java, and other formats, and in mixed formats.

The IP Web client 330 also manages the mapping between the identity and parameters of HAVi Web proxy client 310, and thereby the HAVi-specific application 230 that it represents, and the characteristics of the corresponding communication channel to the Internet 170.

In a preferred embodiment, simultaneous accesses to a single HAVi web proxy 320 by multiple HAVi-specific applications 230 are enabled by the combination of the capability of the HAVi web proxy client 310 to communicate with a HAVi web proxy 320 through HAVi messages, and the capability of the IP web client 330 to manage the mapping between IP communication channels and HAVi Web proxy clients 310.

WEB-to-HAVi THIN GLUE LAYER

The Web-to-HAVi thin glue layer 260 causes the HAVi network 130 to appear as an Internet web server to an Internet web browser 210, and causes the Internet web browser 210 appear as a HAVi application to the HAVi network 130. The Internet browser 210 accesses HAVi services 240, and controls HAVi devices 250, via this glue layer 260. The Web-to-HAVi glue layer 260 includes a HAVi web server 350, a web service executor 360, a web page generator 370, and a translation manager 380.

For ease of understanding, the operation of the Web-to-HAVi thin glue layer 260 is presented via an example of its use, followed by a detailed description of each component.

In an example operation, when a user at the web browser 210 activates the URL of the HAVi web server 350, an IP connection will be established between the Internet web browser 210 and the HAVi web server 350, and the home page of the server 350 will be sent to the browser 210. The home page contains links for accessing HAVi services, one of which is "list all devices". If the user chooses this link, the HAVi web server 350 will ask the web service executor 360 to find the list. The web service executor 360 will then use HAVi registry services to get the information. When the HAVi web server 350 gets the result, it will ask the web page generator 370 to translate the result to a web page. The web page contains active components to allow the user to browse the device properties, select devices, and modify selected device properties. Confirmed device property modifications by the user will result in messages being sent back to the HAVi web server 350. The server 350 will then ask the web service executor 360 to change the device's state, e.g. fast forward the tape in the VCR. Upon receiving the request, the web service executor 360 will first check whether the request is executable, e.g. whether the VCR is already reserved for the requester. If not, and no one else has reserved the device for the desired time period, the executor 360 will first reserve the device, and then carry out the request using underlying HAVi services. It will return the status of execution to the HAVi web server 350. The server 350 will in turn ask the web page generator 370 to form a response page based on the status, and the server 350 will send the page back to the browser 210. More sophisticated pages can be generated to allow timed interactions of multiple devices 250.

The HAVi web server 350 is the gateway for an Internet browser 210 to access HAVi services 240 and devices 250. The server 350 interacts with the browser 210 as an Internet web server. In a preferred embodiment, the following capabilities are included. Additional capabilities may be provided, but at the cost of storage and processing power, which may be limited on a consumer electronic device. The server 350 establishes an IP connection with a browser 210 when the server's URL is invoked. The server 350 presents web pages to the browser 210.

The web pages may include activation facilities, such as links to other URLs, graphic user interface (GUI) widgets, and so on, as well as inactive information items. Via such activation facilities, a user of the browser 210 can invoke HAVi services 240 and control HAVi devices 250. When an activation facility is used, messages are sent to the server 350 from the browser 210. These messages conform to a web protocol, such as HTTP, and the message components include the user requests for HAVi services and objects or user response to queries from the HAVi web server 350. As discussed further below, the encoding of these messages into and from the web protocol is automatically performed by the Translation Manager, thereby allowing the Web-to-HAVi process of this invention to be realized with no modifications required to the browser 210.

The server 350 is configured to process a small subset of the commands defined by the web protocol. The subset is chosen for passing encoded messages between the server 350 and the browser 210. For example, if the HTTP protocol is used, the server 350 is configured to process the GET and POST commands. In this example embodiment, GET is used to indicate a request and POST is used to indicate a response that is carrying data entered by the user. In a preferred embodiment of this invention, the server 350 simply passes the messages, unmodified, to the receiving parties.

Upon receiving a message, the server 350 invokes the translation manager 380 to translate the message into method invocations that are delivered to the web service executor 360. When a response comes back from the web service executor 360, the server 350 invokes the web page generator 370 to generate web pages and plug-ins based on the response from the web service executor 360, for transmission to the browser 210 by the web server 350.

In like manner, when the server 350 receives an event notification from the web service executor 360, the server 350 invokes the web page generator 370 to generate a notification, and communicates the notification to the affected browser 210. The notification can be, for example, a newly formed web page that reflects the new status of a HAVi object 240, 250.

The server 350 in a preferred embodiment is also configured to provide security. For example, if only authorized users can access the server, or if different users have different access rights, the server 350 provides password protection to enforce any access restrictions. If the system allows access from outside the physical security area of the HAVi network, a firewall security system may be used. These and other security methods are common in the art, and include, for example, facilities such as SSL (Secure Socket Layer).

The web service executor 360 carries out requested tasks from the server 350, provides an interface to access HAVi services 240 and devices 250, and monitors events that occur in the HAVi network that will affect the user at the browser 210. In a preferred embodiment, the executor 360 is embodied as a HAVi Software Element, and has direct access to all HAVi facilities on the HAVi network 130. Its interface hides the complexity of HAVi from the server 350, and provides convenience functions for common tasks. In a preferred embodiment, for example, the executor 360 provides a "list of all devices" interface instead of merely providing access to the HAVi registry's interface.

The executor 360 in a preferred embodiment also understands HAVi standard policies, and uses them to guide execution of requests. For example, in accordance with the HAVi standard, HAVi resources must be reserved before being used. The executor 360 checks whether a requesting party has reserved a resource before carrying out a request that will change the state of the resource. For example, if a user asks to set up a VCR (a HAVi device 250 in FIG. 3) to record a particular channel at a particular time, the executor 360 checks whether the VCR is already reserved by the requester. If not, the executor 360 checks whether the VCR is reserved for any conflicting activities. If there is no conflict, the executor 360 reserves the VCR resource, then communicates the appropriate commands to the VCR. If there is a conflict, the executor 360 communicates the conflict to the user via a returned status to the browser 210, via the server 350.

As noted above, the web service executor 360 also monitors events that occur in the HAVi network 130 that may be of interest to the user. For example, when a user at a browser 210 chooses to control a HAVi device 250 through a web page that is composed based on the device's DDI (Data Driven Interaction), the executor 360 monitors events related to the device, using HAVi services. If another user subsequently changes the state of the device using a different interface, for example by manually pressing the pause button on the device, the HAVi network 130 informs the executor 360 of this event. The executor 360 subsequently informs the HAVi web server 350. The server 350 invokes the web page generator 370 to update the control page for the device, and then sends the updated page to the browser 210, thereby notifying the user of the change of state of the device 250.

The HAVi web server 350 and the web service executor 360 together support multiple Internet browser 210 to interact with multiple HAVi objects 240, 250. For this purpose, the HAVi web server 350 manages the mapping between the communication channel to the Internet 170 and the identification of the communicating HAVi object 240, 250, and the HAVi service executor 360 manages the mapping between a communicating HAVi object 240, 250 and the object's identification in the HAVi network 130. The mapping also keeps track of parameters that will allow the web page generator 370 to re-generate web pages for the HAVi object 240, 250, for example, the events relevant to each object 240, 250.

The web page generator 370 works with the translation manager 380 to generate web pages and plug-ins that allow a user to access HAVi services and devices from a browser 210. As required, the generator 370 uses the web service executor 360 interface to get information for page generation. As an example, to generate web pages for controlling a device, the web page generator uses the web service executor 360 interface to access either the device properties known to the HAVi network 130, or the SDD (Self Describing Data) and/or DDI (Data Driven Interaction) associated with the device 250. As another example, to generate a page that allows a user to browse all devices in the HAVI network, the web page generator 370 will use the web service executor 360 interface to query the HAVI registry. Optionally, the web page generator 370 can support the use of a Havlet, and the translation manager 380 can be configured to translate a Havlet to an Applet for the web 170.

The translation manager 380 manages two mapping facilities and their relationships: a Service-to-UI (User Interface) mapping facility and a Message-to-Methods Mapping Facility, and provides an interface to access and update the maps. The primary purpose of the mapping is to control the encoding of the messages that are tunneled between objects residing in two different networks. As a result of this mapping by the translation manager 380, software components in both networks 130, 170, such as web browsers, servers, and HAVi software elements, can be used without modifications. Additionally, other components 350, 360, 370 of this glue layer 260 become simpler and more reusable, by consolidating the translation tasks at the translation manager 380.

The Service-to-UI mapping facility of the translation manager 380 enables an automatic generation of web pages from information in the HAVi registry of the HAVi network 130 and/or directly from the HAVi devices 250 on the network 130. The Service-to-UI mapping facility access HAVi services 240 through the HAVi service executor 360. The web page typically includes both active and inactive components, such as URL links, buttons, forms, text, and so on. A user can activate the active components via the browser 210 to send requests and/or responses to the corresponding objects 240, 250. Encoding of the messages is pre-defined and can be attached to the user-interface objects associated with each object 240, 250 to form proper responses.

The Service-to-UI facility maintains the mapping between the methods defined in the web service executor 360 and the objects, such as URLs, buttons, forms, text blocks, and so on that are used the web page generator 370 for composing web pages. In addition to URL links, GUI widgets, the components 360, 370 can also include semantic information in forms of tagged strings, Java code and others. U.S. patent application, "CONTROL PROPERTY IS MAPPED ONTO MODALLY COMPATIBLE GUI ELEMENT", Ser. No. 09/165,682, now U.S. Pat. No. 6,434, 447, filed 2 Oct. 1998 for Eugene Shteyn, teaches the mapping of data to GUI objects, based on the types of data, and is incorporated by reference herein. For items that do not have conventional data types, the Service-to-UI facility provides mapping tools to assist map building. In one embodiment, for example a mapping tool provides a GUI that lists the items to be mapped, and allows the user to select and link the mapping parties.

The Service-to-UI facility provides the translation services for generating web pages. For a HAVi network, there are three paths to generate web pages: (1) based on registry and device properties, (2) based on DDI (Data Driven Interaction), and (3) via Havlets, discussed further below.

The first path, based on registry information, is best understood using an example. In the case where a user clicks the link "list all devices" in the server's home page, this mapping facility accesses the HAVi registry on the HAVi network 130 to get the HAVi Identifications for all installed devices 250. If the user requests "list all TV tuners that support MPEG2", the mapping facility accesses device properties to select the devices 250 that match the request. It then creates a link in the web page for each selected device. Preferably, the text of each link clearly indicates the device. One way to generate the text is to use device parameters such as device name, user preferred name, manufacture name, and device type. If the user then clicks on a specific device, the HAVi web server 350 retrieves the device's ID in the HAVi network 130 from its browser-HAVi object mapping and invokes the web page generator 370 to generate the page for the device. The mapping facility then accesses the device capabilities and the current state(s) of the selected device. In a preferred embodiment, the Service-to-UI facility uses a predefined capability-to-UI object mapping algorithm to generate one or more web pages for predefined capabilities.

The second path is to use the device's DDI. Using this approach, the mapping facility subscribes to the use of the device's DDI and obtains the device's DIN panels, which can then be mapped to web GUIs in a straightforward fashion.

The third path is to use Havlets. Using this approach, the mapping facility translates a Havlet to an Applet. For this purpose, the mapping facility maintains the full set of HAVi functions that are used to integrate a Havlet into a HAVi network, except these functions are stubs (empty functions). In a preferred embodiment, the facility uses standard Java tools, common in the art, to change a Havlet from a ".jar" file to class files, and uses commonly available tools (such as jad.exe) to change the class file that contains HAVi integration code to source code. Since a Java class file has the same name as the class, the facility easily locates the class. The facility inserts the stubs into the class, and configures the class to inherit from class "applet". In this manner, a recompilation of the Havlet produces the corresponding Applet. The facility effects the recompilation, and generates a corresponding web page for the Applet. A conventional web browser 210 can then execute the applet, using a compatible version of Java.

To improve the speed of the mapping process, a variety of methods, common in the art, may be used, including a pre-construction of the mapping at the time of DCM/FCM installation. The pre-constructed mapping can be thereafter used throughout the time it remains installed, although it may consume excess memory for storing the map for unused devices. Alternatively, the map can be saved in a file when a device is first connected to the HAVi network 130. When the device is used, the file is read. The facility re-generates a map for a device, only when it is determined that the file is out of date.

The Message-to-Methods mapping facility of the translation manager 380 enables the interpretation of the semantics of encoded message components by mapping these components to method invocations to the web service executor 360. Since the encoding is predefined and may be attached to UI objects by the Service-to-UI Mapping facility, discussed above, the Message-to-Methods mapping facility can process their semantics, and can choose appropriate actions. This facility maintains the mapping between the components of the messages coming from an Internet browser 210 and the methods and parameters defined in the web service executor 360 interface. Examples of such message components include URL link names (which can be used to name HAVi services 240 or devices 250), and strings associated with activation of a GUI widget.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the components of the HAVi-Web bridge can be executed on multiple systems connected through a HAVi network. For efficiency, a preferred embodiment collocates the components of each of the sets: the HAVi-specific application 230 and HAVi web proxy client 310; the HAVi web proxy 320 and the IP web client 330; and, the HAVi web server 350, the web service executor 360, the web page generator 370, and the translation manager 380. Each of these sets of collocated components may be arranged on separate or common systems. These and other system configuration and optimization features will be evident to one of ordinary skill in the art in view of this disclosure, and are included within the scope of the following claims.

I claim:

1. A bridge that is configured to facilitate communications between a first network of Non-IP-compatible entities and a second network of IP-compatible entities, comprising:
  a Non-IP to IP interface to facilitate communications between an application entity on the first network and a Web server on the second network comprising:
    an IP Web client that is operably coupled to the second network to selectively translate a first set of communications between the Web server and the first network, and to pass a second set of communications between the Web server and the first network without translation;
    a Non-IP Web proxy that is operably coupled to the IP Web client and the first network, and is configured to make the IP Web client compliant with middleware that is associated with the Non-IP network;
    a Non-IP Web proxy client that is operably coupled to the Non-IP Web proxy and the first network, and is configured to allow the application entity to access the Web server; and
  an IP to Non-IP interface to facilitate communications between a Web browser on the second network and a Non-IP device entity on the first network, comprising:
    a Non-IP Web server that is operably coupled to the second network, to selectively translate a first set of communications between the Web browser and the first network, and to pass a second set of communications between the Web browser and the first network without translation;
    a Web service executor that is operably coupled to the Non-IP web server and to the first network, and is configured to provide access to the Non-IP device entity;
    a Web page generator that is operably coupled to the Non-IP Web Server and to the first network, and is configured to generate web pages for presentation to the Web browser; and
    a translation manager that is operably coupled to the Non-IP Web server, the Web service executor, and the Web page generator, and is configured to provided service-to-user-interface and message-to-methods translation services.

2. The bridge as claimed in claim 1, wherein the Non-IP Web proxy is configured to facilitate communications between the Web server and a Non-IP service.

3. A Non-IP network comprising
  at least one Non-IP-compatible device; and
  a bridge that includes:
  a Non-IP to IP interface to facilitate communications between an application entity on the Non-IP network and a Web server on an IP network comprising:
    an IP Web client that is operably coupled to the IP network, to selectively translate a first set of communications between the Web server and the Non-IP network, and to pass a second set of communications between the Web server and the non-IP network without translation;

a Non-IP Web proxy that is operably coupled to the IP Web client and the Non-IP network, and is configured to make the IP Web client compliant with middleware that is associated with the Non-IP network;

a Non-IP Web proxy client that is operably coupled to the Non-IP Web proxy and the Non-IP network, and is configured to allow the application entity to access the Web server; and an IP to Non-IP interface to facilitate communications between a Web browser on the IP network and the at least one Non-IP-compatible device on the Non-IP network comprising:

a translation manager suitable to provide service-to-user interface and message-to-methods translation services.

4. The Non-IP network as claimed in claim 3, wherein the IP to Non-IP interface further includes:

a Non-IP Web server that is operably coupled to the IP network, and is configured to appear as an Internet server to the Web browser;

a Web service executor that is operably coupled to the Non-IP Web server and to the Non-IP network, and is configured to provide access to the at least one Non-IP-compatible device; and a Web page generator that is operably coupled to the Non-IP Web server and to the Non-IP network, and is configured to generate web pages for presentation to the Web browser;

wherein the translation manager is operably coupled to the Non-IP Web server, to the Web service executor, and to the Web page generator.

5. The Non-IP network as claimed in claim 4, wherein the Non-IP Web server is configured to selectively translate a first set of communications between the Web browser arid the Non-IP network, and to pass a second set of communications between the Web browser and the Non-IP network without translation.

6. A method of enabling interactions between a Non-IP network and an IP network, comprising:

establishing an IP connection between a browser on the IP network and a server at a bridge element through an IP to Non-IP interface, communicating a web page corresponding to the server on a Non-IP network to the browser on an IP network through a Non-IP to IP interface, operably coupling a Non-IP Web proxy to an IP web client and the Non-IP network, operably coupling a Non-IP Web proxy client to the Non-IP Web proxy and Non-IP network, receiving a user input from the browser to the server, based on the web page, processing the user input to produce one or more commands related to an object on the Non-IP network, and communicating the one' or more commands to the object, wherein a first set of communications are selectively translated via a translation manager operatively connected to the Non-IP Web network and suitable to provide service-to-user-interface and message-to-methods translation services, and passed between the browser and the Non-IP network, and a second set of communications are passed between the browser and the Non-IP network without translation.

7. The method of claim 6, further including:

determining a status corresponding to the object on the Non-IP network, creating a web page corresponding to a status of the object, and communicating the web page from the server to the browser.

8. The method of claim 6, further including:

receiving an access request from a Non-IP-compatible application, communicating the access request to a Web server on the IP network, receiving a web page corresponding to the Web server, and communicating messages corresponding to the web page to the Non-IP-compatible application.

* * * * *